(No Model.)

J. NEWBILL.
WAGON BRAKE.

No. 485,332. Patented Nov. 1, 1892.

Witnesses
B. S. Ober
N. J. Riley

Inventor
James Newbill,
By his Attorneys,
C. A. Snow & Co.

UNITED STATES PATENT OFFICE.

JAMES NEWBILL, OF TREZEVANT, TENNESSEE.

WAGON-BRAKE.

SPECIFICATION forming part of Letters Patent No. 485,332, dated November 1, 1892.

Application filed June 21, 1892. Serial No. 437,483. (No model.)

*To all whom it may concern:*

Be it known that I, JAMES NEWBILL, a citizen of the United States, residing at Trezevant, in the county of Carroll and State of Tennessee, have invented a new and useful Wagon-Brake, of which the following is a specification.

The invention relates to improvements in vehicle-brakes.

The object of the present invention is to simplify and improve the construction of vehicle-brakes and to facilitate their attachment and removal from a vehicle.

The invention consists in the construction and novel combination and arrangement of parts hereinafter fully described, illustrated in the accompanying drawings, and pointed out in the claims hereto appended.

Figure 1:
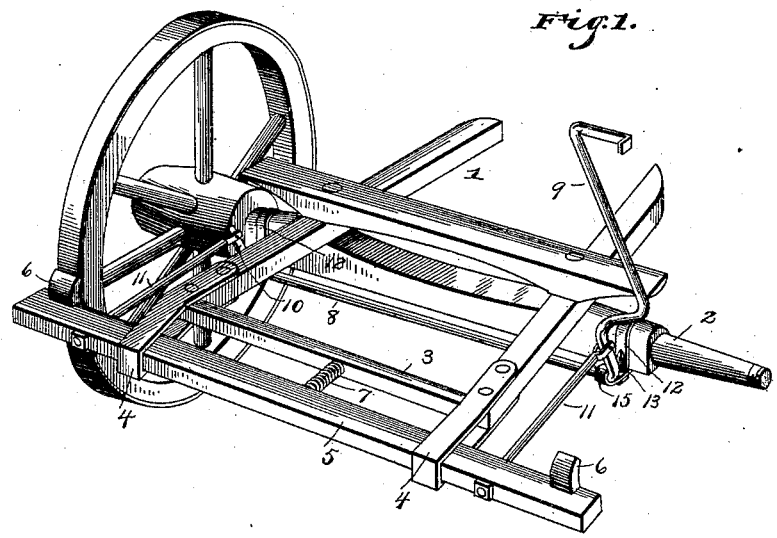
Figure 2:
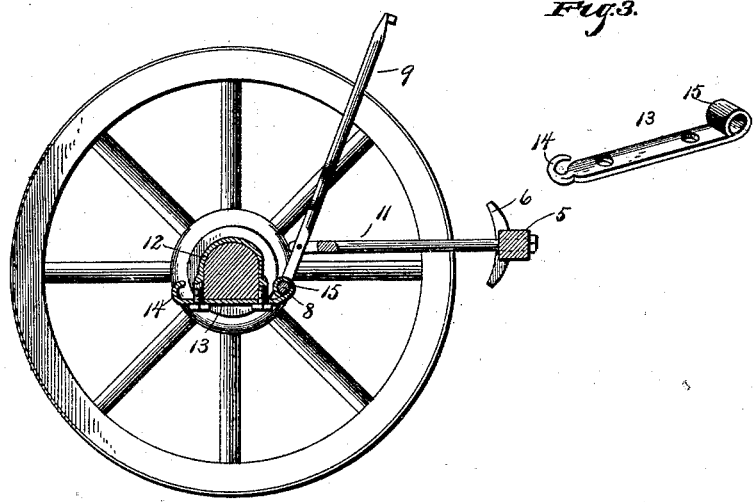
Figure 3:
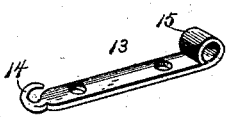

In the drawings, Figure 1 is a perspective view of a portion of a running-gear provided with a brake embodying the invention. Fig. 2 is a vertical sectional view taken longitudinally of the running-gear. Fig. 3 is a detached view of the clip-plate.

Like numerals of reference indicate corresponding parts in all the figures of the drawings.

1 designates front hounds secured intermediate of their ends to a front axle 2 and having their rear ends connected by a transverse bar 3 and provided with horizontally-disposed rearwardly-extending guide-loops 4, in which is arranged a brake-bar 5, which slides in the loops 4 and which carries at its end brake-shoes 6. The rearwardly-extending guide-loop 4 is constructed of a piece of metal which is doubled and has its ends bolted to the upper and lower face of the hound. The brake-shoes are held normally off the wheels by a centrally-arranged spiral spring 7, which is interposed between the transverse bar 3 and the brake-bar 7 and which has its ends secured to those bars.

The brake is applied by means of a rock-shaft 8, which is provided at one end with an arm forming a handle or lever 9 and at the other end with a short arm 10, and both arms are connected by rods 11 with the sliding brake-bar, and the front ends of the rods are bifurcated and pivoted to the arms, and the rear ends are threaded and adjustably connected to the brake-bar by nuts arranged at the front and rear edges of the latter. The rock-shaft is attached to the front axle at the rear side thereof by clips 12, which are provided with clip-plates 13, having stay-chain hooks 14 at their front ends and bearing-eyes 15 at their rear ends to receive the rock-shaft. By this construction the rock-shaft is readily and detachably secured to the front axle and may be quickly and easily removed for repair or the like, and the arrangement of the clip-plates, which are provided at their front ends with hooks, obviates the necessity of passing the shank of the ordinary stay-chain hook through the front axle.

It will be seen that the vehicle-brake is simple and comparatively inexpensive in construction, that it may be readily applied to a vehicle, and may be conveniently removed for repairing or the like.

What I claim is—

1. The combination, with a running-gear, of a transverse bar connecting the rear ends of the front hounds, rearwardly-extending loops projecting horizontally from the rear ends of the front hounds, a brake-bar carrying brake-shoes and arranged in the loops, a centrally-arranged spiral spring interposed between the brake-bar and the transverse bar, clips secured to the front axle and provided at their rear sides with bearings, a rock-shaft journaled in the bearings and provided with arms, one of which is extended to form a handle or lever, and rods connecting the brake-bar with the arms of the rock-shaft, substantially as described.

2. The combination, with a running-gear, of a transverse bar connecting the rear ends of the front hounds, the loops extending rearwardly from the front hounds, a brake-bar arranged in the loops and carrying brake-shoes, a spring interposed between the brake-bar and the transverse bar, clips mounted on the front axle and having clip-plates provided at their front ends with hooks and at their rear ends with bearing-eyes, a rock-shaft journaled in the bearing-eyes and provided with arms, one of the latter being extended to form an operating-lever, and the rods connecting the brake-bar with the arms of the rock-shaft, substantially as described.

In testimony that I claim the foregoing as my own I have hereto affixed my signature in the presence of two witnesses.

JAMES NEWBILL.

Witnesses:
JAMES W. SMITH,
A. E. HILLSMAN.